(12) United States Patent
Tomita (10) Patent No.: US 7,272,458 B2
(45) Date of Patent: Sep. 18, 2007

(54) CONTROL SYSTEM SETTING DEVICE

(75) Inventor: Kazuaki Tomita, Mishima (JP)

(73) Assignee: OMRON Corporation, Kyoto (JP)

( * ) Notice: Subject to any disclaimer, the term of this patent is extended or adjusted under 35 U.S.C. 154(b) by 179 days.

(21) Appl. No.: 11/102,510

(22) Filed: Apr. 8, 2005

(65) Prior Publication Data

US 2005/0228517 A1   Oct. 13, 2005

(30) Foreign Application Priority Data

Apr. 13, 2004   (JP)   ............................ P2004-118427

(51) Int. Cl.
```
G05B 19/42    (2006.01)
G05B 11/01    (2006.01)
G06F 9/45     (2006.01)
G06F 15/00    (2006.01)
G06F 9/44     (2006.01)
G06F 9/445    (2006.01)
```
(52) U.S. Cl. ............................ 700/87; 700/18; 700/19; 703/22; 712/29; 717/105; 717/109; 717/113; 717/176

(58) Field of Classification Search ............... 700/2, 700/5, 9, 17–20, 56, 65, 66, 83, 86, 87; 702/183; 703/22; 709/203, 205, 208, 217, 220; 712/28, 712/29; 717/105, 109, 113, 135, 140, 176; 718/108; 719/328
See application file for complete search history.

(56) References Cited

U.S. PATENT DOCUMENTS

| | | | | |
|---|---|---|---|---|
| 5,237,652 | A * | 8/1993 | McManus | 715/839 |
| 5,812,394 | A * | 9/1998 | Lewis et al. | 700/17 |
| 6,268,853 | B1 * | 7/2001 | Hoskins et al. | 700/83 |
| 6,618,856 | B2 * | 9/2003 | Coburn et al. | 717/135 |
| 6,889,172 | B2 * | 5/2005 | Sierer et al. | 702/188 |
| 6,941,261 | B1 * | 9/2005 | Quinn | 703/27 |
| 7,042,469 | B2 * | 5/2006 | Fuller | 345/629 |
| 7,110,837 | B2 * | 9/2006 | Oka et al. | 700/87 |
| 2004/0220684 | A1 * | 11/2004 | Fukui | 700/18 |

(Continued)

FOREIGN PATENT DOCUMENTS

JP   2001-053763   2/2001

(Continued)

*Primary Examiner*—Crystal J. Barnes
(74) *Attorney, Agent, or Firm*—Beyer Weaver LLP (57) ABSTRACT

A control system with a plurality of devices connected through a network may be started up by connecting a control system setting device including a computer accessible to profile data which describe characteristics of these devices and to program parts for programs executed by these devices. The profile data are prepared individually for the devices, and at least some of them include program part data that specify program parts for at least some of the devices. A memory device stores a control system setting program for creating programs executable by at least some of the devices. This control system setting program serves to input network data related to connection relationships of the devices on the network, to extract program part data from the profile data related to an object device for programming on the network based on the network data, to display on a display device those of program parts that are utilizable by the object device for programming based on the extracted program part data, to have a user to select program parts to be used, and to create the program by using these selected program parts.

7 Claims, 10 Drawing Sheets

U.S. PATENT DOCUMENTS

2004/0267515 A1* 12/2004 McDaniel et al. ............ 703/22
2005/0033457 A1* 2/2005 Yamane ..................... 700/18
2005/0085928 A1* 4/2005 Shani ....................... 700/18
2005/0102651 A1  5/2005 Ueda
2005/0144271 A1* 6/2005 Shirane et al. .............. 709/223
2006/0041324 A1* 2/2006 Chang et al. ................ 700/18

FOREIGN PATENT DOCUMENTS

JP  2001-075616  3/2001
WO  WO02/079886  10/2002

* cited by examiner

| ITEM | DATA (CONTENTS) |
|---|---|
| CPS_VER DATA | Version numbers |
| NETWORK DATA | Connectable network names |
| SERIES DATA | Series names |
| TYPE DATA | Type names |
| CONNECTION DATA | Limitations on connection positions |
| CONNECTION DATA | Connection data |
| CONNECTION DATA | Limitations on the number of connections |
| OPERATION MODE DATA | Operation modes present |
| PARAMETER DATA | Number of parameters present |
| | Parameters position data |
| | Parameter data (types) |
| | Data contents |
| | Maximum value data |
| | Minimum value data |
| | Display method data |
| | Parameter group data |
| | ⋮ |
| ADDITIONAL DATA | FB library data |
| | SAP library data |
| | ⋮ |

CONTROL SYSTEM SETTING DEVICE

Priority is claimed on Japanese Patent Application P2004-118427 filed Apr. 13, 2004.

BACKGROUND OF THE INVENTION

This invention relates to a device connected to a control system including a plurality of components connected by a network for setting up the control system to which it is connected.

Programmable controllers (PLCs) are coming to be commonly used as a control device for factory automation (FA). Such a programmable controller is formed in many situations as an appropriate combination of a plurality of units of various kinds such as a power unit for supplying electrical power, a CPU unit for controlling the entire PLC, an input unit for receiving signals from input apparatus such as switches and sensors that are set at appropriate positions on a production apparatus or an equipment apparatus for the FA, an output unit for outputting control signals to output apparatus such as actuators, and a communication unit for connecting to a communication network. These input and output apparatus are not limited to those that are connected directly to the input or output unit but may be connected to a slave such as an IO terminal such that the connection is made to the PLC from such a slave through the network.

The control by the CPU unit of a PLC is carried out by cyclically repeating the processes of taking in a signal obtained by the input unit to the I/O memory of the CPU unit (IN-refresh), carrying out a logical calculation based on a user program formed by a preliminarily registered ladder language (calculation execution), writing the results of the calculation execution into the I/O memory and transmitting them to the output unit (OUT-refresh), and thereafter carrying out the so-called peripheral processes. The user program is usually created by means of a programming tool for the PLC and downloaded to the CPU unit.

Program parts (or function blocks) which are combinations of a plurality of commands are sometimes used when a user program is created for a PLC. In such a case, it is a programming tool for the PLC that manages the program parts for the PLC. An example of such a programming tool for a PLC using function blocks is described in International Patent Publication Pamphlet 2002/079886.

It also happens sometimes to monitor not only the conditions of the PLC itself but also the operating conditions of the entire control system controlled by the PLC by observing the operating conditions of the PLC such as the contents of the IO memory and to set or update parameters of the PLC by writing data into the IO memory. Such monitoring and setting operations may be carried out by means of a programmable display adapted to display monitored data by its function component for making graphic displays on its display screen and to input set data through a touch panel on the function component. These monitoring and setting operations may be carried out not only for the PLC but also for other components. In order to make the programmable display operable, it is necessary to preliminarily program the contents of the display screen, that is, which functional components are to be used and with the IO memory of which component each functional component should be correlated. Such programming is carried out by means of a programming tool for the human-machine interface.

The functional component necessary for the programming of the contents of display by the programmable display is managed by the programming tool for the programmable display. Japanese Patent Publication Tokkai 2001-75616 describes an example of such a programming tool for a programmable display. Japanese Patent Publication Tokkai 2001-53763 describes an example of a tool for setting up a network.

Conventionally, it was necessary, when a network-setting tool was used for network setting, to carry out the work of specifying the component to be connected to the network and, when the programming of a PLC or a programmable display was to be carried out independent of this work, to carry out the work of distinguishing function blocks and functional components that are utilizable in correlation with the components connected to the network by using a tool for that purpose. For this reason, the work of programming was inefficient. It is therefore an object of this invention to improve the efficiency of programming work by correlating the work of network setting with the work of programming the PLC and the programmable display.

SUMMARY OF THE INVENTION

A control system setting device according to this invention is intended to be connected to a control system including a plurality of devices connected through a network for the purpose of setting up this control system and comprises a computer, a display device and a memory. The computer is accessible to profile data which describe characteristics of the devices and to program parts for programs executed by the devices.

In the above, the program parts may be function blocks utilizable for programming programs executed by a programmable controller. As another example, they may be human-machine interface functional parts utilizable for programs executed by a programmable display device.

The profile data are prepared individually for the devices. At least some of these profile data may include program part data that specify program parts for at least some kinds of these devices. Profile data of at least some kinds of the devices include program part data utilizable for the devices of these kinds.

The memory device stores a control system setting program for aiding the creation of programs executable by at least some kinds of the devices such as the CPU unit and programmable display devices of a programmable controller. The system setting program is adapted to input network data related to connection relationships of the devices on the network, to extract program part data from the profile data of a device related to an object device for programming on the network based on the network data, to display on the display device those of program parts that are utilizable by the object device for programming based on the extracted program part data, to have a user to select program parts to be used, and to create the program by using the selected program parts.

Programming becomes easier with a control system setting device thus structured because program parts that can be utilized by the object device for programming can be identified by using the network data and the program part data in the profile data.

The control system setting program may preferably include a network tool that sets up the network and a device programming tool for creating a program executed by devices. The network tool is adapted to display the network data on the display device, to have the user to select the object device for programming, to extract program part data from the profile data related to the device selected on the network and to prepare the extracted program part data so as to be utilizable by the device programming tool that aids programming of the selected object device. The device programming tool serves to display on the display device, based on the program part data prepared by the network tool, program parts that are utilizable by the object device for programming.

Since a control system setting device provided with such a control system setting program has both network and device programming tools and any numbers of them can be freely combined, control systems of various types can be set up according to this invention.

The invention further relates to the aforementioned control system setting program, the memory device that stores the control system setting program and the method carried by the control system setting program as described above.

DETAILED DESCRIPTION OF THE INVENTION

Figure 1:
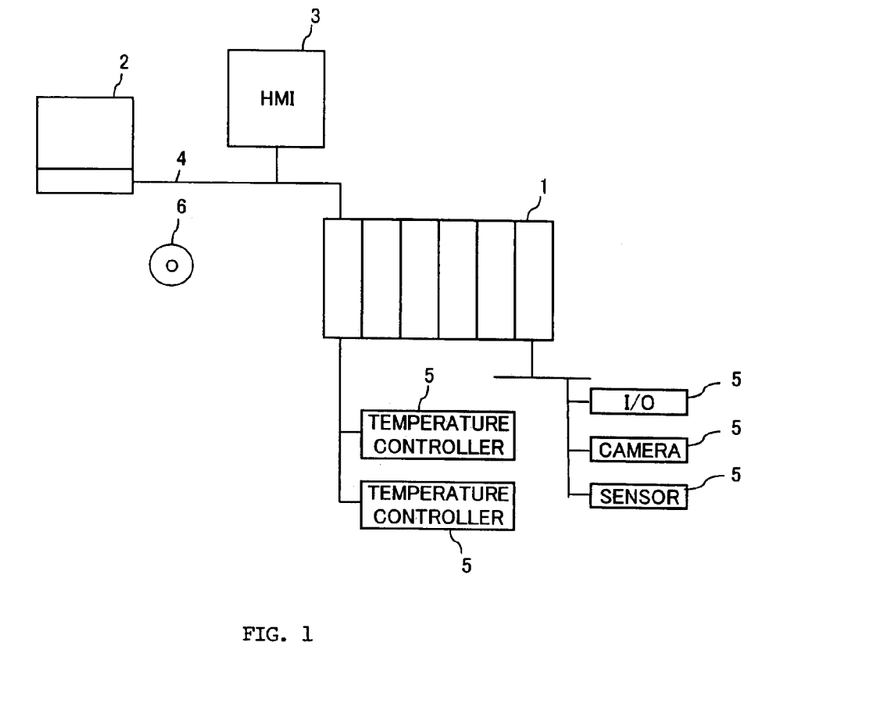
FIG. 1 shows an example of control system.

FIG. 1 shows an example of control system with a plurality of components connected through a network, including a programmable controller (programmable logic controller PLC) 1 comprised of a plurality of units such as a power unit, a CPU unit, a communication unit, and IO unit and advanced units for controlling a production line. Each of these constituent units, as well as the PLC itself, may be hereinafter sometimes referred to as a "component" or a "device" for convenience.

A control system setting device 2 and a programmable display (or a human-machine interface HMI) 3 are connected to the PLC 1 through a network 4 (a data network such as Ethernet®). The programmable display is also referred to as a programmable terminal (PT). Also connected to the PLC 1 are components 5 of various kinds inclusive of input devices such as temperature controllers, cameras, switches and sensors, output devices such as relays and motors and IO terminals for connecting these input and output devices. These components and the advanced units that form the PLC 1 are controlled by a user program executed by the CPU unit, and data collection, setting and changes are effected by accessing from the programmable display 3 (human-machine interface HMI).

The control system setting device 2 may be realized by installing a control system setting program in a personal computer and is provided with the function of creating and editing a user program to be downloaded to the CPU unit of the PLC 1 and the function of creating and editing a program for the programmable display 3. The control system setting program is made available by being stored on a memory medium such as a CD-ROM 6 or by being downloaded from a server through the Internet.

Figure 2:
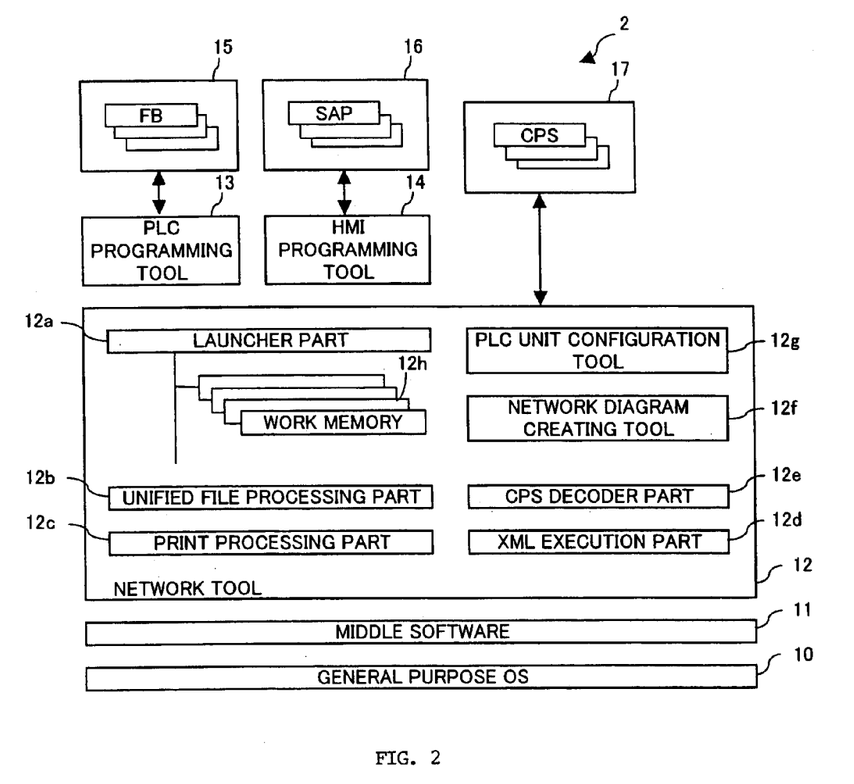
FIG. 2 is a drawing that shows the software structure of the control system setting device.

FIG. 2 shows the software structure of the control system setting device 2. As shown, the control system setting device 2 is provided with a general purpose operating system (OS) 10, a middleware 11 which serves as a bridge between the general purpose OS 10 and each of the tools, a network tool 12 that is executed on the middleware 11, a PLC programming tool 13, an HMI programming tool 14, a function block library 15, an HMI functional component library 16 and a component profile sheet (CPS) library 17. The function block library 15 is a library for function blocks which are program components for the PLC to be utilized by the PLC programming tool 13. The HMI functional component library 16 is a library for HMI functional components (trade name SAP (Smart Active Parts) produced by OMRON Corporation) which are program components for the programmable display utilized by the HMI programming tool 14. The CPS library 17 is a library for profile data (trade name CPS produced by OMRON Corporation) that describe the characteristics of the components 5 included in units comprising the PLC 1 and the control system.

The network tool 12 is provided with a launcher part 12a for starting up a related program, a unified file processing part 12b, a print processing part 12c, an XML (extensible markup language) execution part 12d, a CPS decoder part 12e, a network diagram creating tool 12f and a PLC configuration tool 12g. The network diagram creating tool 12f is for creating and editing data on the network and the components connected to the network. The PLC configuration tool 12g is for creating and editing data on the unit structure of the PLC 1. The network tool 12 serves to manage the function library 15, the HMI functional component library 16 and the CPS library 17, to call the PLC programming tool 13 and the HMI programming tool 14 and to share data in common with these tools.

The PLC programming tool 13 serves to create and edit a user program by appropriately using the function blocks stored in the function block library 15. The HMI programming tool 14 serves to create and edit a program for the programmable display by appropriately using the HMI functional components stored in the HMI functional component library 16.

Figure 3:
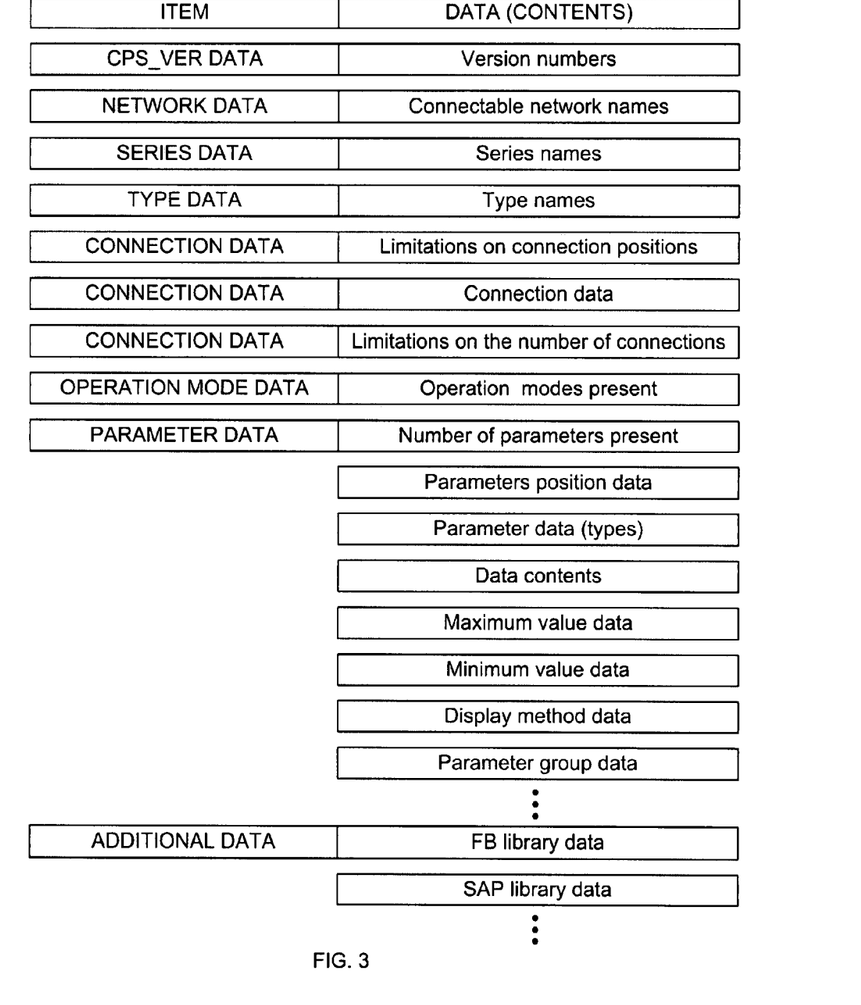
FIG. 3 shows an example of data structure of a components profile sheet (CPS).

FIG. 3 shows the structure of the CPS. The version number of the CPS is displayed in the area for "CPS-VER Data" and the names of the networks to which the component is connectable are displayed in the area for "Network Data." The series name and the type name of the component are registered respectively in the areas for "Series Data" and "Type Data." In the above, the series name means the name of the group to which the component belongs and the type name is for identifying the type of the component.

Limiting conditions on the connection position, connection data and limiting conditions on the number of connections are registered in the area for "Connection Data." In the case of a unit comprising the PLC, if there is a connectable position for such a unit (such as if it is connectable only to the end position (No. 0) of the base plate), this connectable condition is stored. The limiting conditions on the number may include the number of components that may be connected to the same base plate or to the same network.

The modes in which the component can be operated such as the operation mode and the stop mode are described in the area for "Operation Mode Data." The number of parameters possessed by the component is described in the area for "Parameter Data" and parameter data as well as details of the parameters are registered. Although not shown, an area for display format data is used for defining a display format such as whether the recorded values should be outputted directly in binary-coded decimal (BCD) or after a conversion, for example, from 0/1 into normal/abnormal.

If there are function blocks that may be used in connection with the component, the FB library data (the FB program part data) for identifying them are registered in the area for "Additional Data." If there are HMI function component data that are usable in connection with the component, the SAP library data (or the SAP program part data) that specified them are also registered in the area for "Additional Data."

The CPS defines each of these items in the form of Extensible Markup Language (XML) such that the CPS can be used without relying upon the operating system of the computer comprising the user's control system setting device 2 and also that the manufacturer can incorporate any data items to the CPS. The CPS may be made available to the purchase of a component by packing together with the component the memory medium such as a CD-ROM storing the CPS, by storing it in the server on the Internet and allowing the user to download it through the Internet, or by storing it on a memory medium within the component and causing it to be uploaded through the network connected to the component. It may alternatively so arranged that a desired CPS is downloaded through the Internet whenever it is to be used, without providing the control system setting device 2 with the CPS library 17. This is the same with the function block library 15 and the HMI functional component library 16.

The CPS decoder part 12e of the network tool 12 serves to check the presence or absence of the FB library data and the SAP library data as the Additional Data on the CPS and, in the case of the presence of either, to extract these library data (library name and attribute data). The unified file processing part 12b registers the extracted library data in the function block library 15 or the HMI functional component library 16. The obtained CPS is registered in the CPS library 17. In this operation, the CPS may be stored in the CPS library either after the FB library data and the SAP library data are deleted or without these data being deleted. It may also be so arranged that the CPS is registered in the CPS library 17, when it is obtained, without checking whether the FB library data and the SAP library data are present and to extract them, if necessary, when the CPS is made use of. The XML execution part 12d executes the portion of the XML description on the CPS, whenever necessary, that is description in an executable way.

Figure 4:
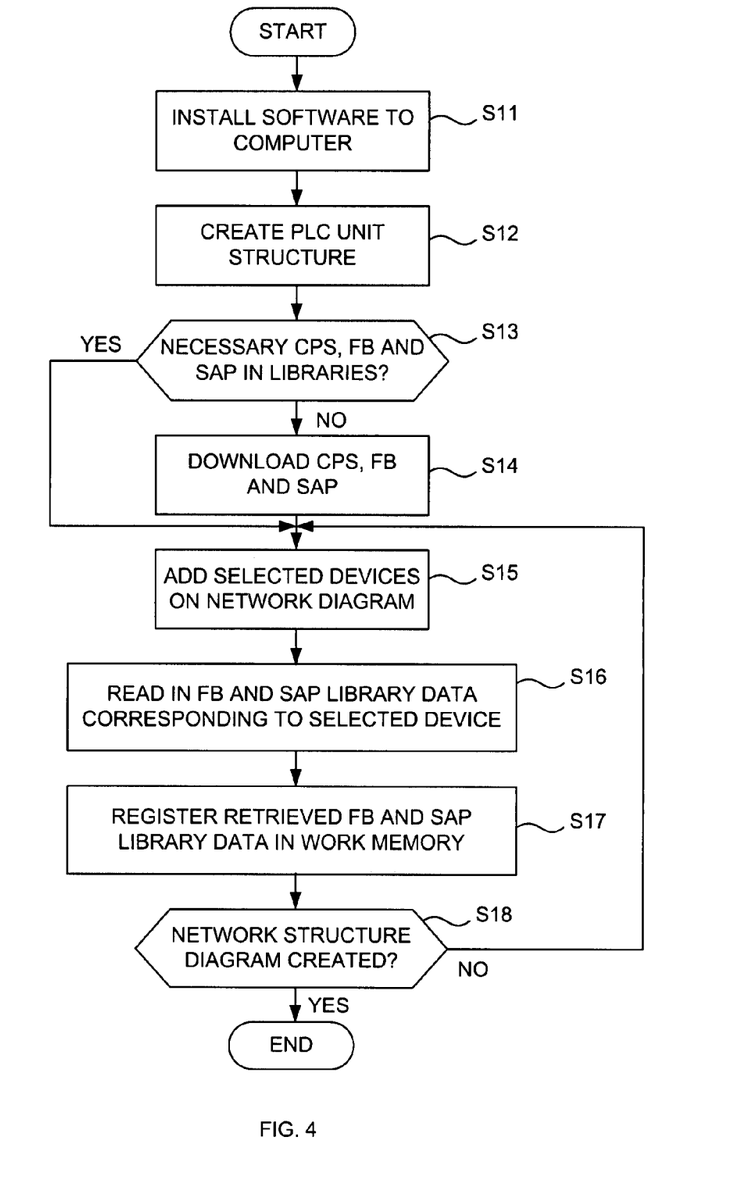
FIG. 4 is a flowchart for showing the processes of using the network tool as well as its operations.

FIG. 4 is a flowchart for showing the processes of using the network tool 2 as well as its operations. Preliminarily, the user installs the software structure shown in FIG. 2 in a computer to form the control system setting device 2 (Step S11). Each of the tools and libraries shown in FIG. 2 will be together referred to as the unified development tool. It is sufficient to carry out its installation only once at the beginning.

Next, the PLC configuration tool 12g is activated to create the unit structure of the PLC (Step S12) by displaying a list of the components stored in the CPS library 12 and sequentially selecting the corresponding units of the PLC (say, by the drag-and-drop method). The user checks whether the CPS, FB and SAP related to the components necessary for forming the control system are stored in the library or not (Step S13). In the case of an absence (NO in Step S13), necessary CPS, FB and SAP are downloaded from the server on the Internet (Step S14). Alternatively, a memory medium such as a CD-ROM storing data on the corresponding units may be obtained from the manufacturer.

Figure 7:
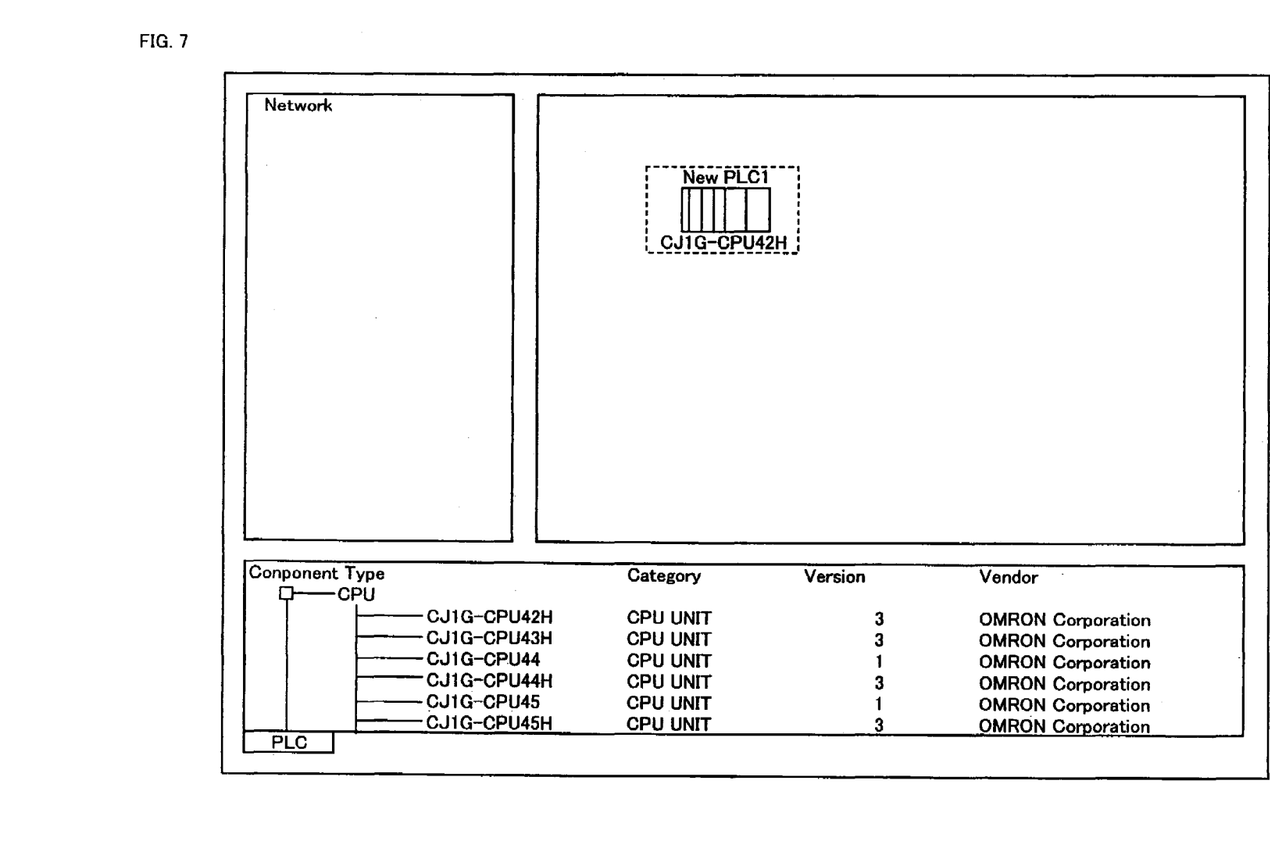
FIGS. 7 and 8 are examples of display screen for creating a network structure diagram.
Figure 8:
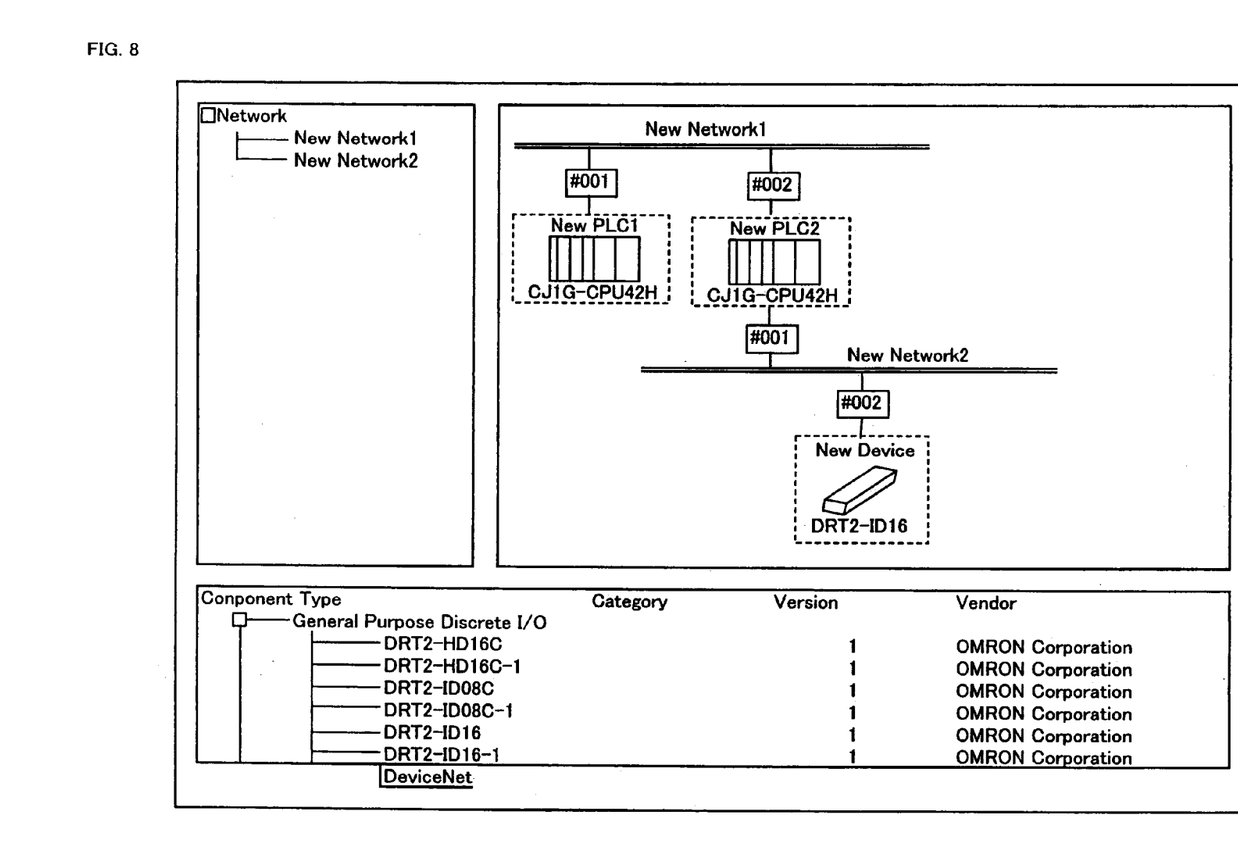

Next, the user activates the network diagram creating tool 12f to create a network structure diagram. FIGS. 7 and 8 show the display screen of the control system setting device 2. As shown, a list display area for displaying a list of components is set in the lower part, a network creating area for creating a network structure diagram is set on the top right-hand side, and an area for displaying the structure (connection relationship) of the network created in the network creating area in a tree-form is set on the top left-hand side. The user selects components such as the PLC and programmable displays from the list display area and adds them to the network structure diagram (Step S15). FIG. 7 shows one of the PLCs listed in the list display area being selected and placed by the drag-and-drop method in the network creating area. FIG. 8 shows a component connected to a field bus (a lower network) being added to the network structure diagram.

When a certain component is selected in connection with the creation of a network structure diagram, the network took 12 retrieves the corresponding FB library data and the SAP library data from the corresponding CPS or the function block library 15 and the HMI function component library 16 (Step S16). The FB library data and the SAP library data thus retrieved are registered in each work memory 12h of the launcher part 12a (Step S17). Explained more in detail, it is the library name that is registered such that corresponding program parts become retrievable from the library by using this library name as the key.

Figure 9:
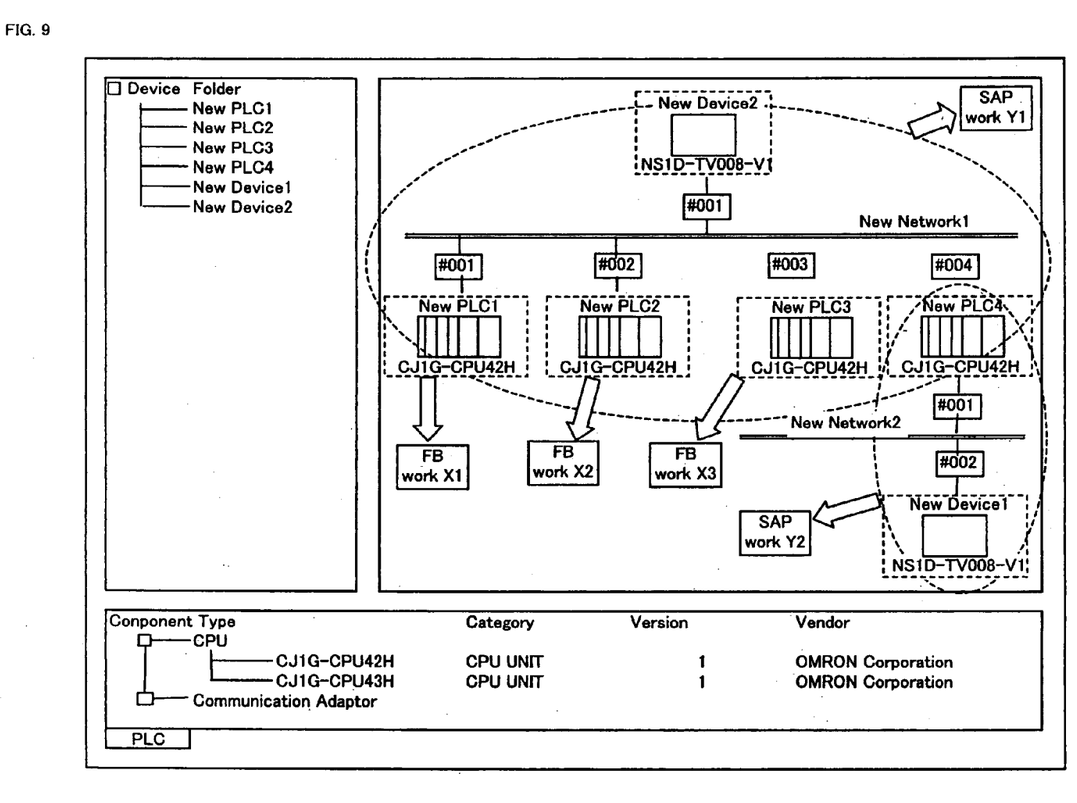
FIG. 9 shows a display screen of a network structure diagram for explaining the relationship between the work memory and the network structure diagram.

At this moment, the FB library data are made into groups for each of the PLCs that are related on the network structure diagram and stored in this correlated form in the work memories 12h. In FIG. 9, these groups of FB library data thus stored are indicated as Work X1, Work X2 and Work X3. As for the SAP library data, those correlated to the programmable display 3 on the network structure diagram are grouped and stored in the work memory 12h in correlation with the programmable display. In FIG. 9, these groups of SAP library data thus stored are shown as Work Y1 and Work Y2.

The processes from Step S15 to Step S17 are repeated until the creation of the network structure diagram is completed (YES in Step S18) and the series of processes using the network diagram creating tool 12f is completed.

Figure 5:
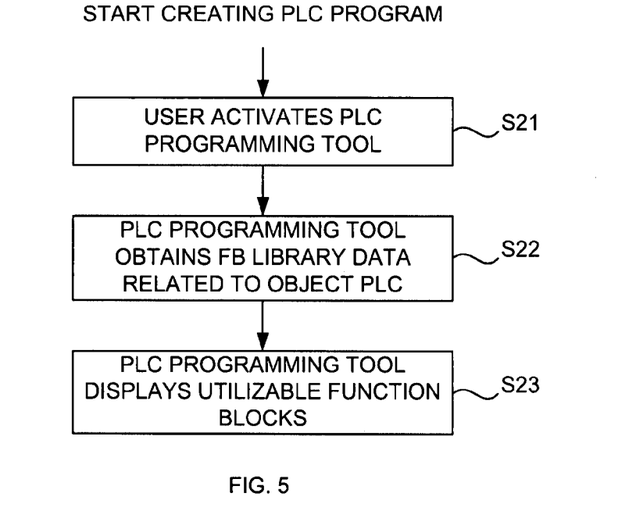
FIG. 5 is a flowchart for showing the processes of using the PLC programming tool as well as its operations.

FIG. 5 is a flowchart for showing the processes of using the PLC programming tool 13 as well as its operations. As the programming of the PLC is started, the user activates the PLC programming tool 13 (Step S21). This may be done either directly by the user or by clicking the PLC on the network structure diagram such that the network tool 12 will activate the PLC programming tool 13 by recognizing it. By either method, the PLC programming tool 13 is thereby informed of the PLC for which the programming is to be carried out.

The PLC programming tool 13 references the work memory 12h to obtain the FB library data correlated to the PLC which is the object of the programming (Step S22). These are data on the function blocks which are actually utilizable in the programming in the user's network structure. The PLC programming tool 13 displays a list of the names of the utilizable function blocks (Step S23). Since the displayed function blocks are all utilizable, the user can create and edit a program by selecting necessary function blocks conveniently from the displayed list without going through any trouble of searching for them.

Figure 10:
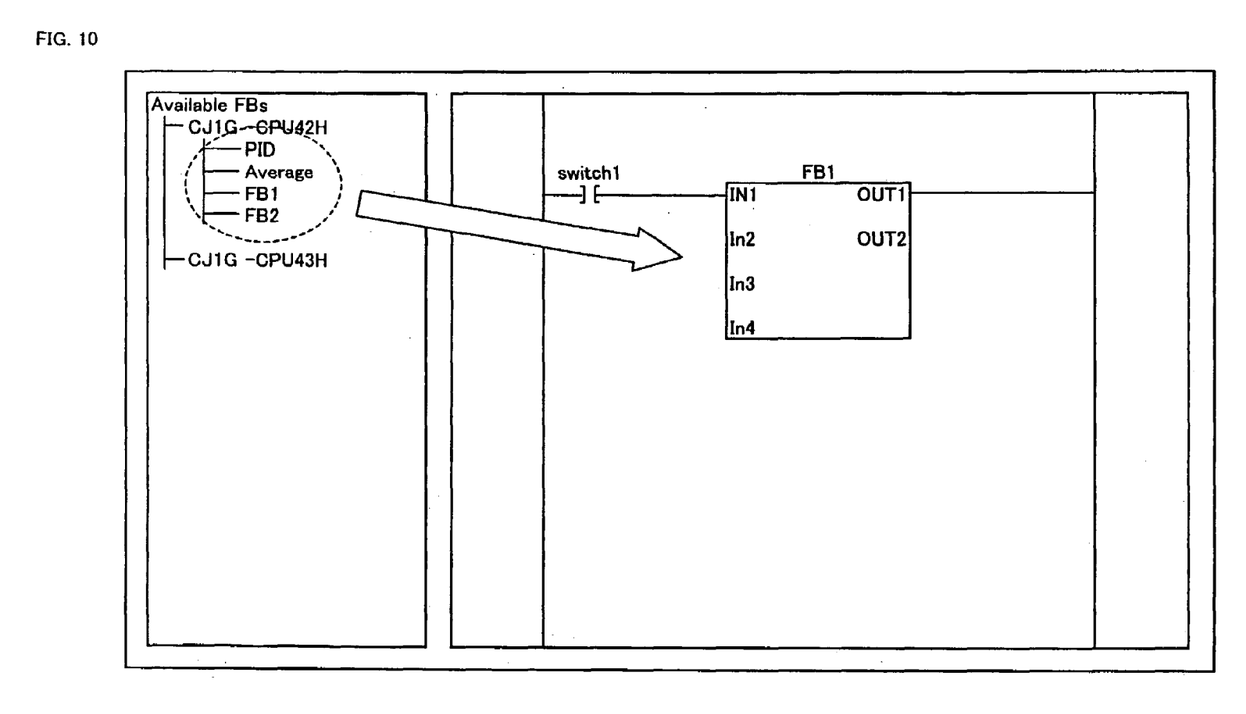
FIG. 10 shows a display screen of the PLC programming tool.

FIG. 10 shows an example of display screen on the PLC programming tool 13. A list of utilizable function blocks is displayed in the form of a tree inside an area on the left-hand side of the display screen. The user can select an appropriate one of them within the circular frame and drag and drop it inside the program area on the right-hand side prepared for drawing a ladder language program to use the function block in the programming.

Figure 6:
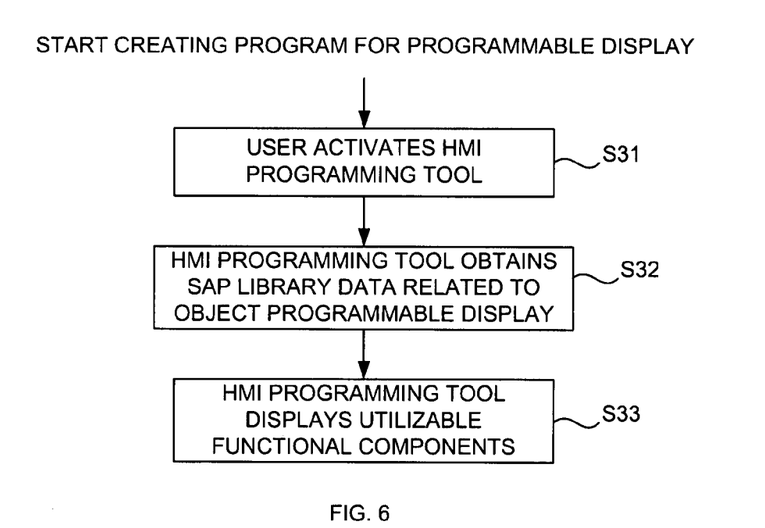
FIG. 6 is a flowchart for showing the processes of using the HMI programming tool as well as its operations.

FIG. 6 is a flowchart for showing the processes of using the HMI programming tool 14 as well as its operations. As the programming of the programmable display is started, the user activates the HMI programming tool 14 (Step S31). This may be done either directly by the user or by clicking the programmable display on the network structure diagram such that the network tool 12 will activate the HMI programming tool 14 by recognizing it. By either method, the HMI programming tool 14 is thereby informed of the programmable display for which the programming is to be carried out.

The HMI programming tool 14 references the work memory 12h to obtain the SAP library data correlated to the programmable display which is the object of the programming (Step S32). These are data on the HMI functional components which are actually utilizable in the programming in the user's network structure. The HMI programming tool 14 displays a list of the names of the utilizable HMI functional components (Step S33). Since the displayed HMI functional components are all utilizable, the user can create and edit a program by selecting necessary HMI functional components conveniently from the displayed list without going through any trouble of searching for them.

Figure 11:
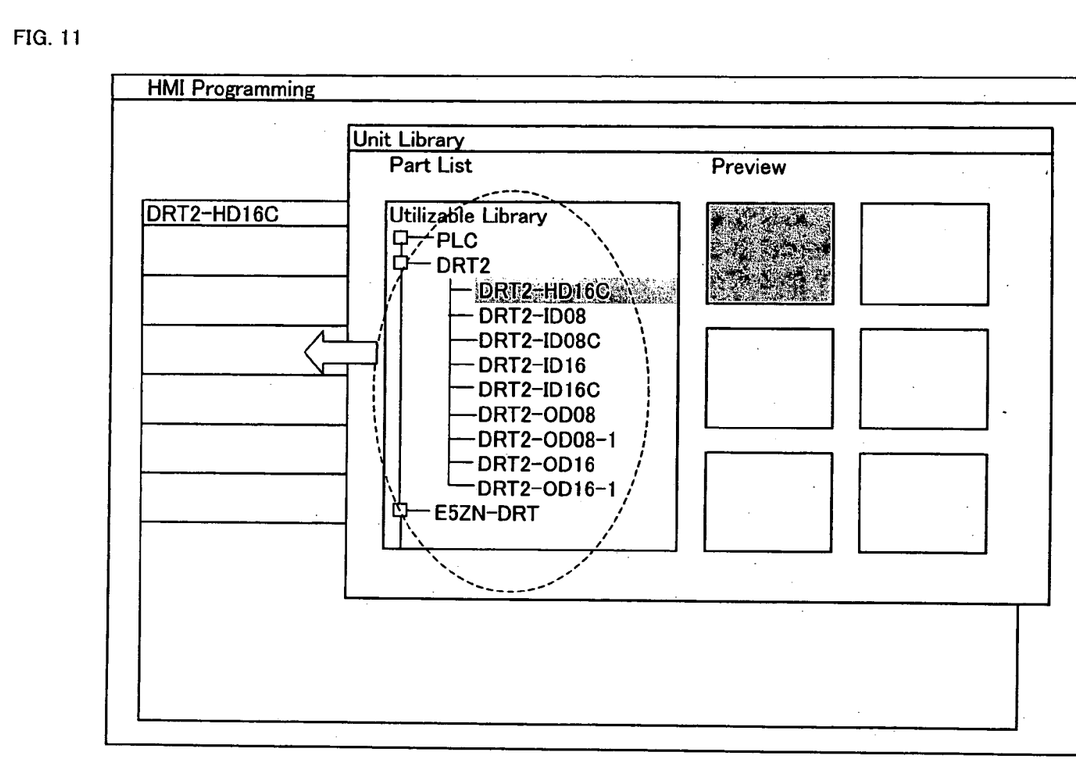
FIG. 11 shows a display screen of the HMI programming tool.

FIG. 11 shows an example of display screen on the HMI programming tool 14. A list of utilizable HMI functional components is displayed in the form of a tree inside an area in front. The user can select an appropriate one of them within the circular frame also by referencing the preview-displayed images of the HMI functional components and drag and drop it inside the program area for setting a display screen of the programmable display to use the HMI functional component in the programming.

What is claimed is:

1. A control system setting device to be connected to a control system for setting up said control system, said control system including a plurality of devices connected through a network, said control system setting device comprising:
   a display device;
   a computer that is accessible to profile data which describe characteristics of said devices and to program parts for programs executed by said devices, said profile data being prepared individually for device types of programmable controllers and programmable display devices, the profile data for each kind of programmable controller including program part data that specify function blocks usable for programming the programmable controller, and the profile data for each kind of programmable display device including program part data that specify HMI function component data usable for programming the programmable display device; and
   a memory device that stores a control system setting program for creating programs executable by at least some kinds of said devices, said control system setting program being adapted to input network data related to connection relationships of said devices on said network, to extract program part data from the profile data of a device related to an object device for programming on said network based on said network data, to display on said display device those of program parts that are utilizable by the object device for programming based on said extracted program part data, to have a user to select program parts to be used, and to create said program by using said selected program parts.

2. The control system setting device of claim 1 wherein said control system setting program includes a network tool that sets up said network and a device programming tool for creating a program executed by devices;
   wherein said network tool is adapted to display said network data on said display device, to have said user to select said object device for programming, to extract program part data from the profile data related to the device selected on said network and to prepare said extracted program part data so as to be utilizable by the device programming tool that aids programming of said selected object device; and
   wherein said device programming tool serves to display on said display device, based on said program part data prepared by said network tool, program parts that are utilizable by said object device for programming.

3. The control system setting device of claim 1 wherein the profile data for a programmable controller further include data for specifying IO units usable by the programmable controller.

4. A memory medium that stores a control system setting program retrievable by a computer, said control system setting program being adapted to be executed by a control system setting device for setting up a control system including a plurality of devices connected through a network, said control system setting device comprising said computer and a display device and being accessible to profile data which describe characteristics of said devices and to program parts for programs executed by said devices, said profile data being prepared individually device types of programmable controllers and programmable display devices, the profile data for each kind of programmable controller including program part data that specify function blocks usable for programming the programmable controller, and the profile data for each kind of programmable display device including program part data that specify HMI function component data usable for programming the programmable display device, said control system setting program comprising the steps of:
   inputting network data related to connection relationships of said devices on said network;
   extracting program part data from the profile data of a device related to an object device for programming on said network based on said network data;
   displaying on said display device those of said program parts that are utilizable by the object device for programming based on said extracted program part data;
   having a user to select program parts to be used, and
   creating a program executable by at least some of said devices by using said selected program parts.

5. A tangible computer-readable medium recording a control system setting program for setting up a control system including a plurality of devices connected through a network, said control system setting program being adapted to be executed by a computer provided with a display device, said computer being accessible to profile data which describe characteristics of said devices and to program parts for programs executed by said devices, said profile data being prepared individually device types of programmable controllers and programmable display devices, the profile data for each kind of programmable controller including program part data that specify function blocks usable for programming the programmable controller, and the profile data for each kind of programmable display device including program part data that specify HMI function component data usable for programming the programmable display device, said control system setting program comprising the steps of:

inputting network data related to connection relationships of said devices on said network;

extracting program part data from the profile data of a device related to an object device for programming on said network based on said network data;

displaying on said display device those of said program parts that are utilizable by the object device for programming based on said extracted program part data;

having a user to select program parts to be used, and creating a program executable by at least some of said devices by using said selected program parts.

6. A method of setting up a control system, said control system including a plurality of devices connected through a network, profile data which describe characteristics of said devices being prepared individually device types of programmable controllers and programmable display devices, the profile data for each kind of programmable controller including program part data that specify function blocks usable for programming the programmable controller, and the profile data for each kind of programmable display device including program part data that specify HMI function component data usable for programming the programmable display device; said method comprising the steps of:

inputting network data related to connection relationships of said devices on said network;

extracting program part data from the profile data of a device related to an object device for programming on said network based on said network data;

displaying on a display device those of said program parts that are utilizable by the object device for programming based on said extracted program part data;

having a user to select program parts to be used, and creating a program executable by at least some of said devices by using said selected program parts.

7. The method of claim 6 wherein said steps are executed by a computer provided with said display device, said computer being accessible to said profile data and to said program parts for programs executed by said devices.

* * * * *